(12) United States Patent
Lin et al.

(10) Patent No.: US 10,302,866 B2
(45) Date of Patent: May 28, 2019

(54) POLARIZATION SPLITTERS

(71) Applicant: Finisar Corporation, Sunnyvale, CA (US)

(72) Inventors: Shiyun Lin, San Diego, CA (US);
Bryan Park, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 15/962,619

(22) Filed: Apr. 25, 2018

(65) Prior Publication Data

US 2018/0314005 A1    Nov. 1, 2018

Related U.S. Application Data

(60) Provisional application No. 62/491,860, filed on Apr. 28, 2017.

(51) Int. Cl.
| | |
|---|---|
| G02B 6/27 | (2006.01) |
| G02B 6/122 | (2006.01) |
| G02B 6/126 | (2006.01) |
| G02B 6/28 | (2006.01) |
| G02B 6/293 | (2006.01) |
| G02B 6/12 | (2006.01) |

(52) U.S. Cl.
CPC .......... *G02B 6/2773* (2013.01); *G02B 6/126* (2013.01); *G02B 6/1228* (2013.01); *G02B 6/2713* (2013.01); *G02B 6/283* (2013.01); *G02B 6/29398* (2013.01); *G02B 2006/12061* (2013.01)

(58) Field of Classification Search
CPC .. G02B 6/2773; G02B 6/29398; G02B 6/283; G02B 6/2713; G02B 6/1228; G02B 6/126; G02B 2006/12061
See application file for complete search history.

(56) References Cited

U.S. PATENT DOCUMENTS 9,122,006 B1 * 9/2015 Roth ............... G02B 6/126
2017/0052317 A1   2/2017 Mahgerefteh et al.

FOREIGN PATENT DOCUMENTS

WO    2016/071345 A1    5/2016

OTHER PUBLICATIONS

International Search Report and Written Opinion dated Jul. 16, 2018, in related PCT Application No. PCT/US2018/030003.

\* cited by examiner

*Primary Examiner* — Ryan A Lepisto
(74) *Attorney, Agent, or Firm* — Maschoff Brennan

(57) ABSTRACT

Various embodiments relate to polarization splitters. A polarization splitter may include a silicon nitride (SiN) waveguide core configured to receive an input light signal having a first polarization mode and a second polarization mode. The polarization splitter may further include a silicon (Si) slot waveguide core disposed proximate the SiN waveguide core. The Si slot waveguide core may include a tapered portion at a first end configured to couple the first polarization mode to the Si slot waveguide.

20 Claims, 8 Drawing Sheets

POLARIZATION SPLITTERS

CROSS REFERENCE TO RELATED APPLICATIONS

A claim for benefit of priority to the Apr. 28, 2017 filing date of the U.S. Patent Provisional Application No. 62/491,860, titled POLARIZATION SPLITTERS (the '860 Provisional Application), is hereby made pursuant to 35 U.S.C. § 119(e). The entire disclosure of the '860 Provisional Application is hereby incorporated herein.

FIELD

The embodiments discussed herein relate to polarization splitters.

BACKGROUND

Polarization splitters may be used to separate transverse electric (TE) waves and transverse magnetic (TM) waves of a received light signal. Extinction ratios of conventional polarization splitters are often less than satisfactory.

The subject matter claimed herein is not limited to embodiments that solve any disadvantages or that operate only in environments such as those described above. Rather, this background is only provided to illustrate one example technology area where some embodiments described herein may be practiced.

SUMMARY

An example embodiment includes a polarization splitter. The polarization splitter includes a silicon nitride (SiN) waveguide core configured to receive an input light signal having a first polarization mode and a second polarization mode. The polarization splitter also includes a silicon (Si) slot waveguide core disposed proximate the (SiN) waveguide core. The Si slot waveguide may include a tapered portion at a first end to enable the first polarization mode to couple to the Si slot waveguide.

In another example embodiment, a system includes a polarization splitter. The polarization splitter includes a SiN channel waveguide configured to receive an input light signal including a first polarization mode and a second polarization mode, and output a signal including the second polarization mode. The polarization splitter further includes a Si slot waveguide core disposed beneath the SiN waveguide. The Si slot waveguide includes a tapered portion at a first end of the Si slot waveguide core. The Si slot waveguide may be configured to couple the first polarization mode to the Si slot waveguide, and output a signal including the first polarization mode.

According to another embodiment, a polarization splitter includes a SiN waveguide core and a Si waveguide core disposed proximate the SiN waveguide core. The SiN waveguide core includes a coupling region and may be configured to receive an input light signal including a first polarization mode and a second polarization mode. The Si waveguide core includes a slot-to-channel converter and may be configured to couple the first polarization mode to the Si waveguide.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTIONS OF THE DRAWINGS

Example embodiments will be described and explained with additional specificity and detail through the use of the accompanying drawings in which.

DESCRIPTION OF SOME EXAMPLE EMBODIMENTS

Various embodiments disclosed herein relate to polarization splitters. More specifically, some embodiments relate to polarization splitters including a waveguide (e.g., a channel waveguide) on a silicon nitride (SiN) layer and a slot waveguide on a silicon (Si) layer, which is positioned proximate the SiN layer. Various embodiments may be configured to provide relatively high extinction ratios and, therefore, may be utilized with, for example, polarization insensitive circuits that may require high extinction polarization splitters.

Embodiments of the present disclosure will be explained with reference to the accompanying drawings.

Figure 1:
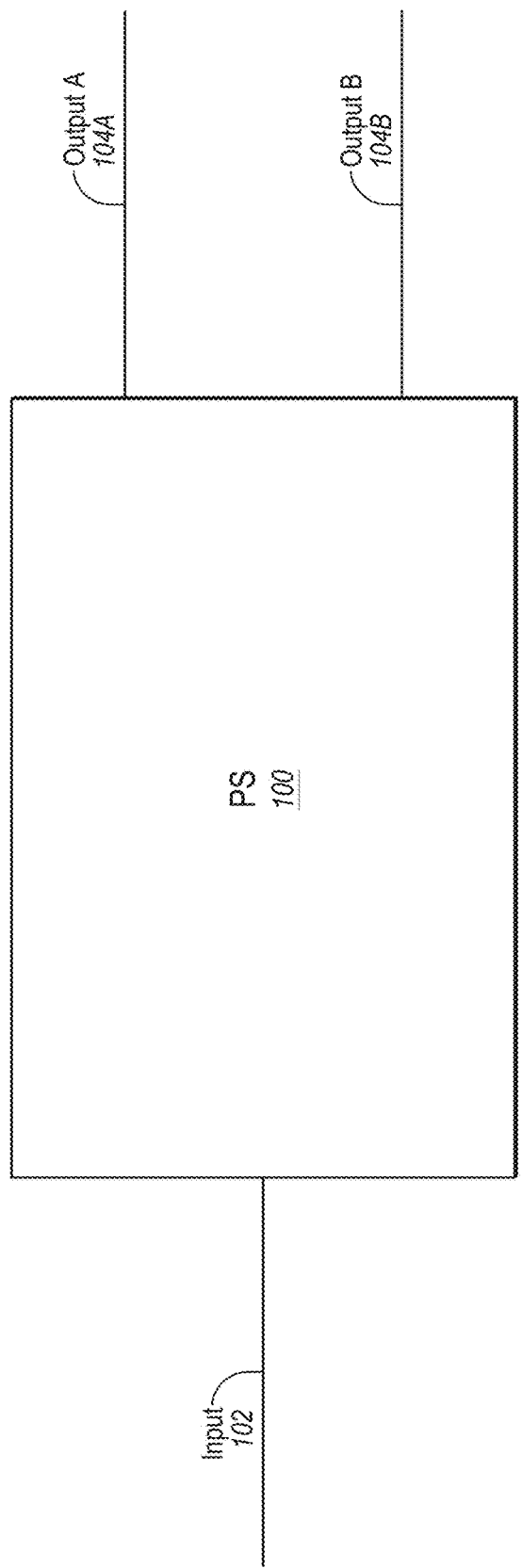
FIG. 1 illustrates an example polarization splitter.

FIG. 1 illustrates an example polarization splitter (PS) 100 that includes a single input 102 and two outputs 104A, 104B (generically "outputs 104" or specifically "output A 104A" or "output B 104B"), arranged in accordance with at least one embodiment described herein. According to various embodiments, each of input 102 and output 104A may include a SiN waveguide (e.g., a SiN waveguide core surrounded by a suitable cladding). Further, output 104B may include either a SiN waveguide (e.g., a SiN waveguide core surrounded by a suitable cladding) or a Si waveguide (e.g., a Si waveguide core surrounded by a suitable cladding).

During a contemplated operation of PS 100, input 102 may receive an incoming light signal (also referred to herein as an "input beam") with two components with orthogonal polarizations (e.g., a first component with transverse electric (TE) polarization and a second component with transverse magnetic (TM) polarization). In some example embodiments, PS 100 may be configured to split the incoming light signal into the first and second components, rotate or convert polarization of one or more of the components, output the first component or the second component via output A 104A, and/or output the first component via output B 104B.

Figure 2:
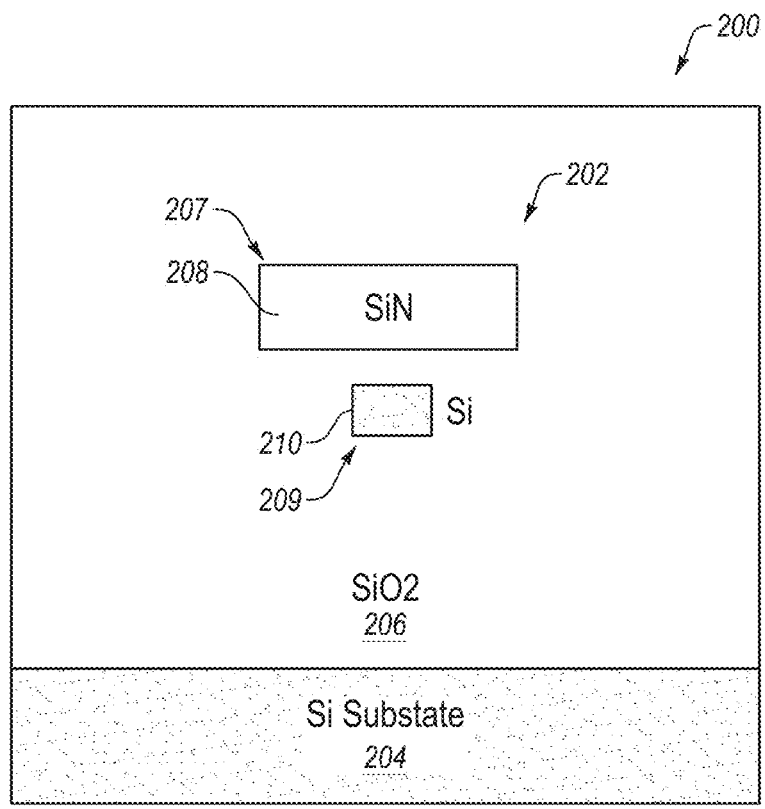
FIG. 2 is a cross-sectional view of a portion of a silicon (Si) photonic integrated circuit (PIC)

FIG. 2 is a cross-sectional view of a portion of a photonic integrated circuit (PIC) 200 with a PS 202, arranged in accordance with at least one embodiment described herein. PS 202 may include or correspond to PS 100 of FIG. 1. PIC 200 may include a Si substrate 204, a buried oxide (BOX) layer 206 that may include silicon dioxide (SiO2) or other suitable oxide, a SiN layer (not labeled) including SiN waveguide 207, and an Si layer (not labeled) including Si waveguide 209. PIC 200 may include one or more other layers, components, materials, etc.

SiN waveguide 207 includes a SiN waveguide core 208 together with surrounding cladding, which may include SiO2 or other suitable cladding. Si waveguide 209 includes a Si waveguide core 210 together with surrounding cladding, which may include SiO2 or other suitable cladding. According to some embodiments, Si waveguide 209 may be implemented as a slot waveguide, and SiN waveguide 207 may be implemented as a channel waveguide. A SiN layer (e.g., including SiN waveguide 207) with intermedium index may provide better mode match to fiber, low-thermo-optical effect (e.g., for temperature insensitive multiplexers and demultiplexers), and may support optical power at relatively high power levels.

Figure 3:
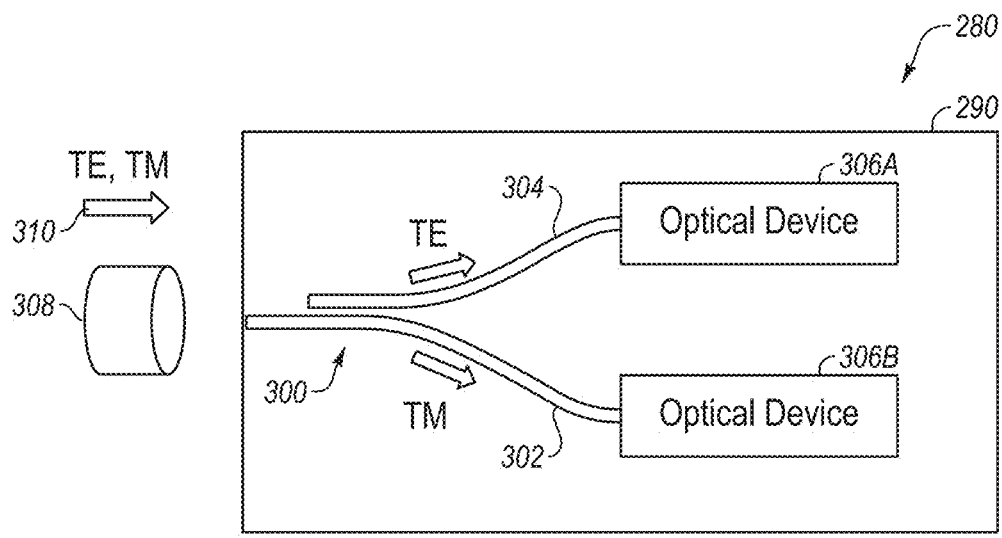
FIG. 3 illustrates an example system including a silicon photonic device.

FIG. 3 depicts a system 280 including a silicon photonic (SIP) device 290, arranged in accordance with at least some embodiments disclosed herein. SIP device 290 may include a PS 300 including a first waveguide 302 and a second waveguide 304. For example, first waveguide 302 may be implemented as a SiN waveguide and second waveguide 304 may be implemented as a Si waveguide. Further, in some embodiments, first waveguide 302, which may also be referred to herein as an "input waveguide," may be implemented as a SiN channel waveguide, and second waveguide 304 may be implemented as a Si slot waveguide.

SIP device 290 may also include optical devices 306A and 306B, wherein first waveguide 302 is coupled to optical device 306B and second waveguide 304 is coupled to optical device 306A. System 280 further includes a light source 308 (e.g., an optical fiber) for transmitting an input beam (e.g., also referred to herein as an "input light signal") 310 including both TE and TM polarization modes to SIP device 290.

According to various embodiments disclosed herein, polarization splitter 300 may be configured to split input beam 310 into the first and second components (e.g., TE and TM modes) and provide an output beam including a TM mode to optical device 306B and another output beam including a TE mode to optical device 306A. Compared to the TM mode, the TE mode of a light signal may exhibit better phase match, and thus the TE mode may couple more quickly to, for example, a waveguide with a relatively short length.

Figure 4:
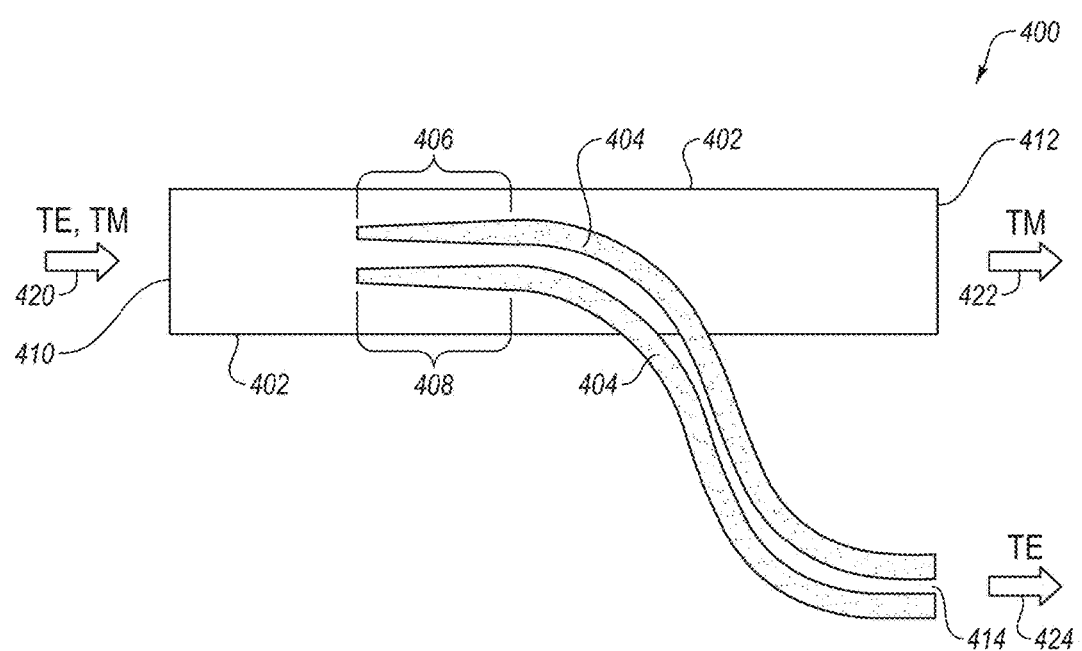
FIG. 4 depicts an example polarization splitter including a SiN waveguide and a Si waveguide.

FIG. 4 depicts an example polarization splitter 400, arranged in accordance with at least one embodiment disclosed herein. More specifically, FIG. 4 illustrates a polarization splitter 400 including a SiN waveguide core 402 and a Si waveguide core 404. Waveguide cores may be surrounded by cladding (not illustrated in FIG. 4). In some embodiments, SiN waveguide core 402 may be formed in a first layer of a PIC, and Si waveguide core 404 may be formed in a second layer of the PIC that is above or below the first layer of the PIC. SiN waveguide core 402 may also be referred to herein as an "input waveguide core."

According to various embodiments, SiN waveguide core 402 may be implemented as a channel waveguide core and Si waveguide core 404 may be implemented as a slot waveguide core. SiN waveguide core 402 may include a coupling portion 406 and Si waveguide core 404 may include a tapered portion 408 that tapers outward from an end of Si waveguide core 404.

Tapered portion 408 may be aligned (e.g., in two orthogonal directions (e.g., x and z directions)) with the coupler portion 406 of the SiN waveguide core 402 such that tapered portion 408 overlaps in the two orthogonal directions and is parallel to coupling portion 406. Tapered portion 408 of Si waveguide core 404 may be configured to couple most of a first polarization (e.g., TE polarization) of an input beam 420 to Si waveguide core 404 and to prevent most of a second polarization (e.g., TM polarization) of input beam 420 that is orthogonal to the first polarization from being coupled to Si waveguide core 404.

Polarization splitter 400 further includes an input port 410 for receiving an input beam 420, an output port 412 for outputting an output beam 422, and an output port 414 for outputting an output beam 424. More specifically, SiN waveguide core 402 includes input port 410 and output port 412, and Si waveguide core 404 includes output port 414. In some embodiments, input beam 420 received via input port 410 may include both TE and TM modes, output beam 422 conveyed via output port 412 may include the TM mode, and output beam 424 conveyed via output port 414 may include the TE mode.

Due to the slot effect of a Si slot waveguide (e.g., Si slot waveguide core 404), the effective index of the TE mode for the Si slot waveguide may be much smaller than that of the TM mode. Thus, polarization splitter 400 may be configured to provide for optimal phase matching conditions for the TE mode between the SiN waveguide and the Si slot waveguide, while providing a large phase mismatch for the TM mode. Therefore, the TE mode may quickly couple (e.g., over a shorter distance) to the Si waveguide (e.g., including Si waveguide core 404) while the TM mode, which couples more slowly, primarily remains in the input SiN waveguide (e.g., including SiN waveguide core 202). In contrast to conventional polarization splitters, various embodiments disclosed herein may provide a large extinction ratio due to the large birefringence provided by the slot effect.

Figure 5A:
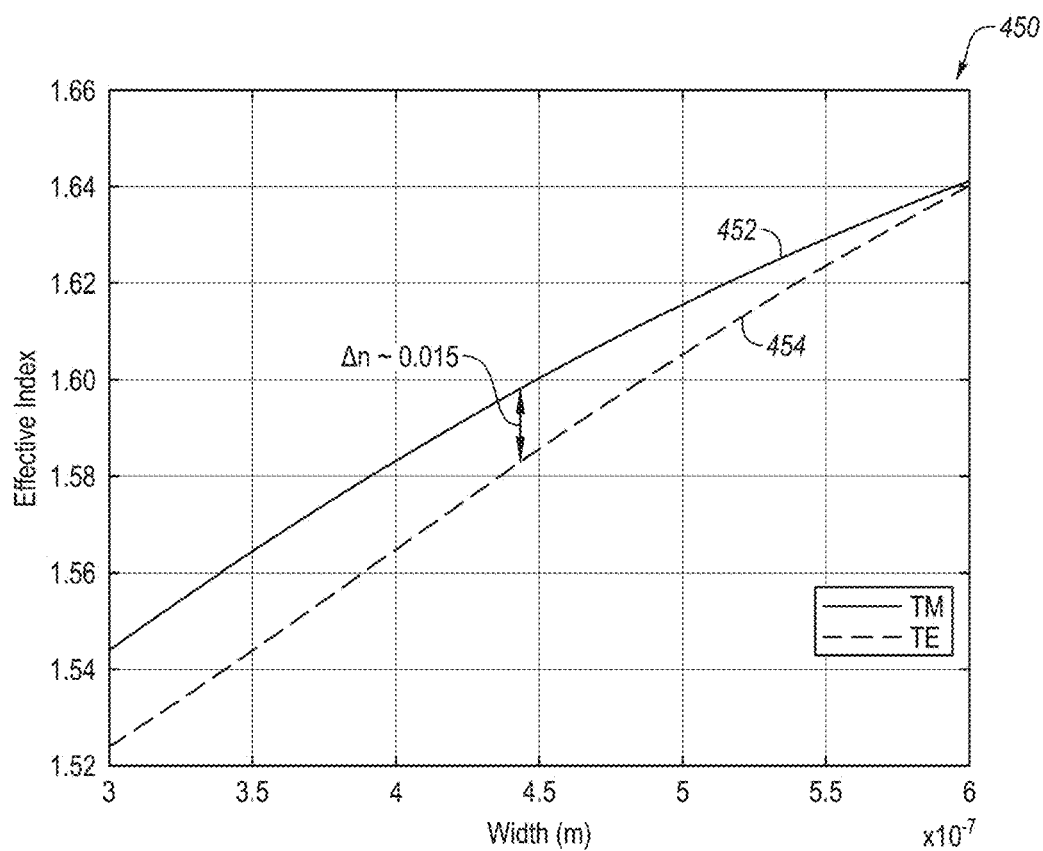
FIG. 5A is a plot depicting simulation results that illustrate an effective index of a SiN waveguide core.
Figure 5B:
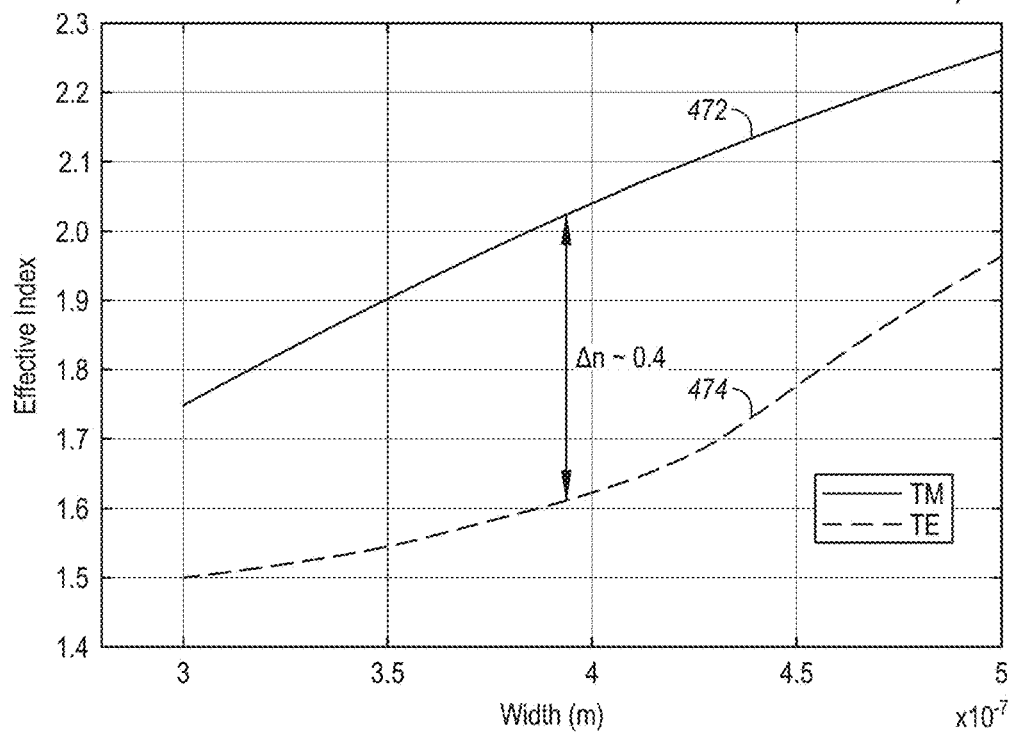
FIG. 5B is a plot depicting simulation results that illustrate an effective index of a Si waveguide core.

FIG. 5A depicts simulation results 450 that illustrate an effective index of SiN waveguide core 402 of FIG. 4 as a function of a width of SiN waveguide core 402 for TM and TE polarization modes, arranged in accordance with at least one embodiment described herein. More specifically, a curve 452 represents the effective index of the TM mode, and a curve 454 represents the effective index of the TE mode. FIG. 5B depicts simulation results 470 that illustrate an effective index of Si waveguide core 404 of FIG. 4 as a function of a width of Si waveguide core 404 for TM and TE polarization modes, arranged in accordance with at least one embodiment described herein. More specifically, a curve 472 represents the effective index of the TM mode, and a curve 474 represents the effective index of the TE mode.

As shown in FIGS. 5A and 5B, the difference between the effective index for the TM mode and the effective index for the TE mode is much greater in Si waveguide core 404 compared to the SiN waveguide core 402 (e.g., an effective index difference of 0.015 for SiN waveguide core 402 at a width and an effective index difference of 0.4 for Si waveguide core 404 at a similar width). Therefore, the effective index for TE mode in the SiN waveguide and the effective index for the TE mode in the Si waveguide are similar, and consequently they are well-phase matched and coupling between the waveguides is strong. However the effective index for the TM mode in the SiN waveguide and the effective index for the TM mode in the Si waveguide are different, and as a result, the coupling between two waveguides is poor. Such polarization-dependent coupling behavior may lead to a high polarization extinction ratio.

Figure 6:
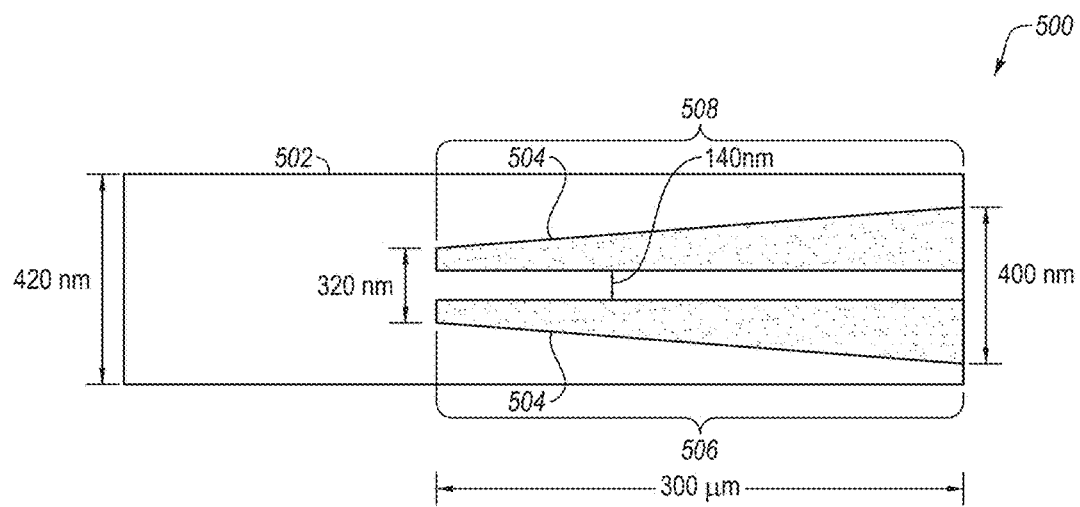
FIG. 6 illustrates a stage of an example polarization splitter.

FIG. 6 depicts an example stage 500 of a polarization splitter (e.g., PS 400 of FIG. 4), arranged in accordance with at least one embodiment described herein. Stage 500 includes a SiN waveguide core 502 having a coupling portion 506, and Si waveguide core 504 includes a tapered portion 508. As illustrated in FIG. 6, in an example implementation, SiN waveguide core 502 may have a width of about 420 nanometers (nm). Further, a slot region of tapered portion 508 of Si waveguide core 504 may have a width of about 140 nm, and tapered portion 508 of Si waveguide core 504 may have a length of about 300 micrometers (μm). Further, a first end of tapered portion 508 may have a width of about 320 nm, and a second end of tapered portion 508 may have a width of about 400 nm.

Figure 7:
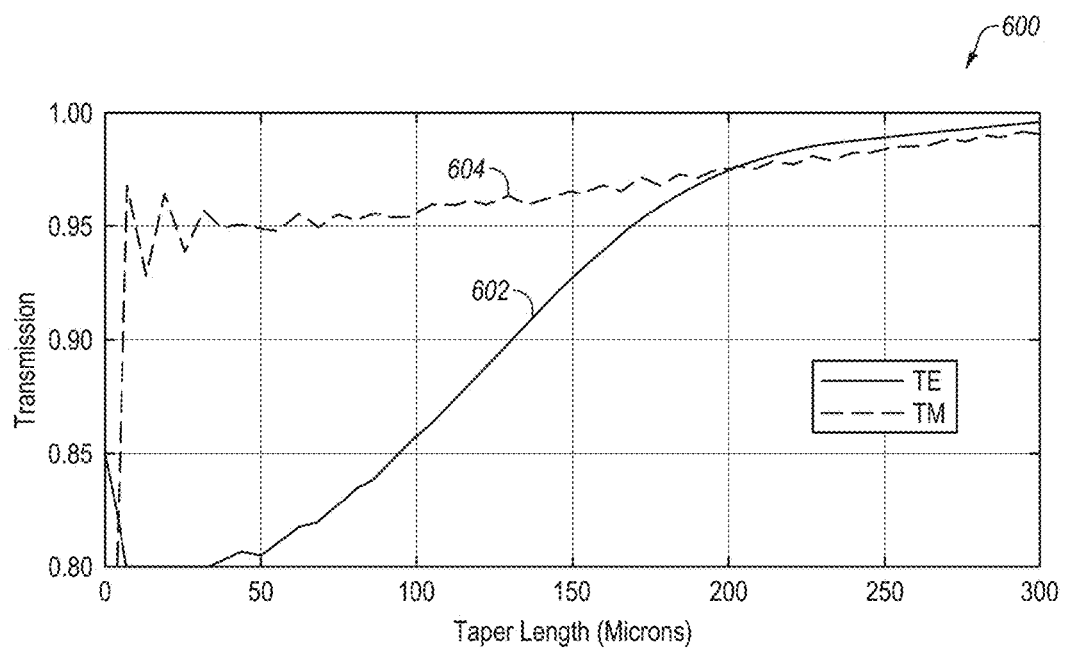
FIG. 7 is a plot depicting simulation results that illustrate the transmission efficiency of a polarization splitter.

FIG. 7 depicts simulation results 600 that illustrate the transmission efficiency of a polarization splitter as a function of a length of a tapered portion of a waveguide (e.g., tapered portion 408/508 of Si slot waveguide 400; see FIGS. 4 and 6). More specifically, simulation results 600 includes a curve 602 that represents the transmission efficiency of the TE mode and a curve 604 that represents the transmission efficiency of the TM mode. As shown in simulation results 600, at taper lengths less than about 200 microns, transmission efficiency of the TE mode decreases. However, at taper lengths of about 200 microns or more, transmission efficiency of the TE mode and the TM mode is about 98% or greater. Further, at least some embodiments may provide for an extinction ratio of about 20 dB or more, compared to about 10 dB for conventional polarization splitters.

Figure 8A:
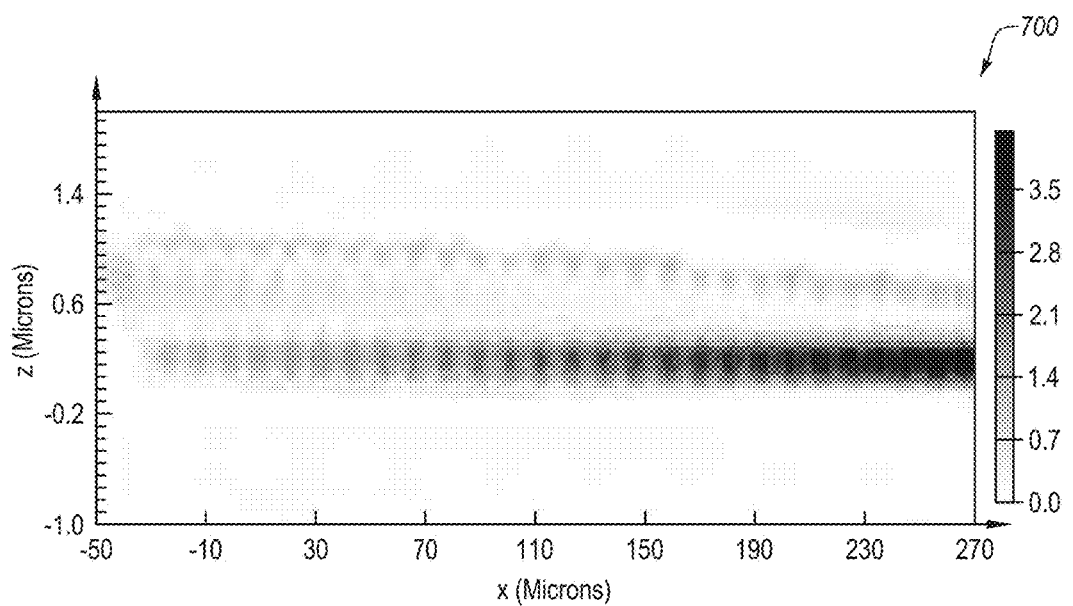
FIGS. 8A and 8B depict graphical representations of simulated light modes of TM and TE polarized light in the waveguides of FIG. 4.

Simulation results 700 shown in FIG. 8A illustrate the TE mode of a light signal received at a polarization splitter (e.g., polarization splitter 400 of FIG. 4), arranged in accordance with at least one embodiment disclosed herein. More specifically, simulation results 700 illustrates the transition of the TE mode from a SiN waveguide core (e.g., SiN waveguide core 402; see FIG. 4) to a Si slot waveguide core (e.g., SiN waveguide core 404; see FIG. 4). As depicted in results 700, the TE mode, which in received in a first layer (e.g., including SiN waveguide core 208; see FIG. 2), transitions from the first layer to a second layer (e.g., including Si waveguide core 210; see FIG. 2) beneath the first layer.

Figure 8B:
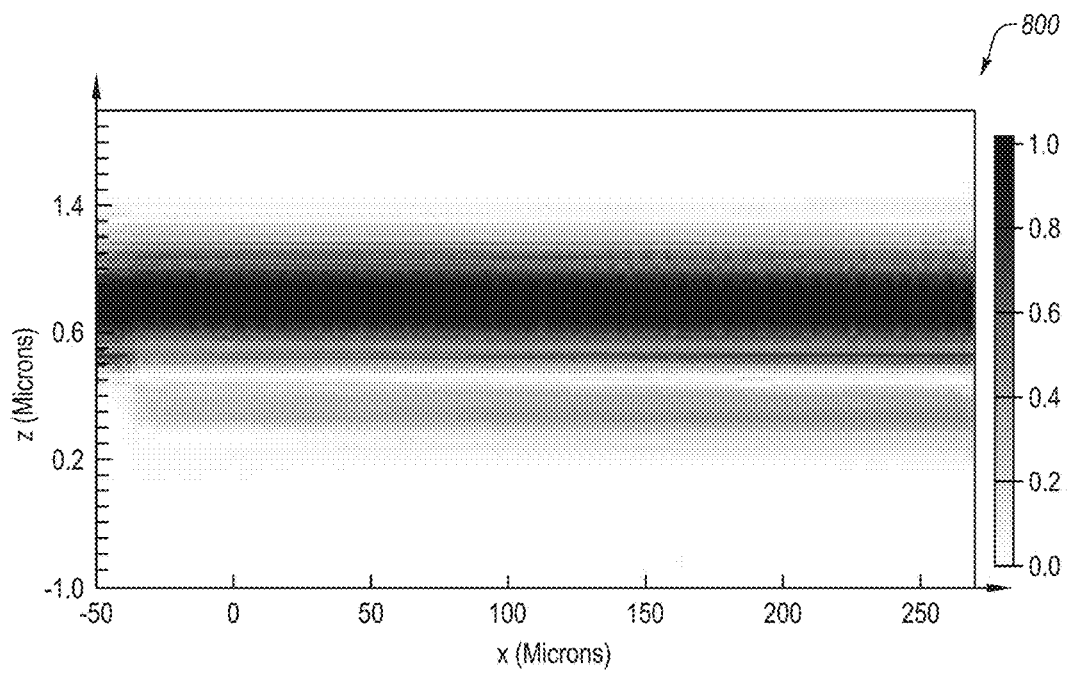

Simulation results 800 shown in FIG. 8B illustrate the TM mode of the light signal received at the polarization splitter (e.g., polarization splitter 400 of FIG. 4), arranged in accordance with at least one embodiment disclosed herein. As depicted in results 800, the TM mode is received in and remains in a first layer (e.g., including SiN waveguide core 208; see FIG. 2).

Figure 9:
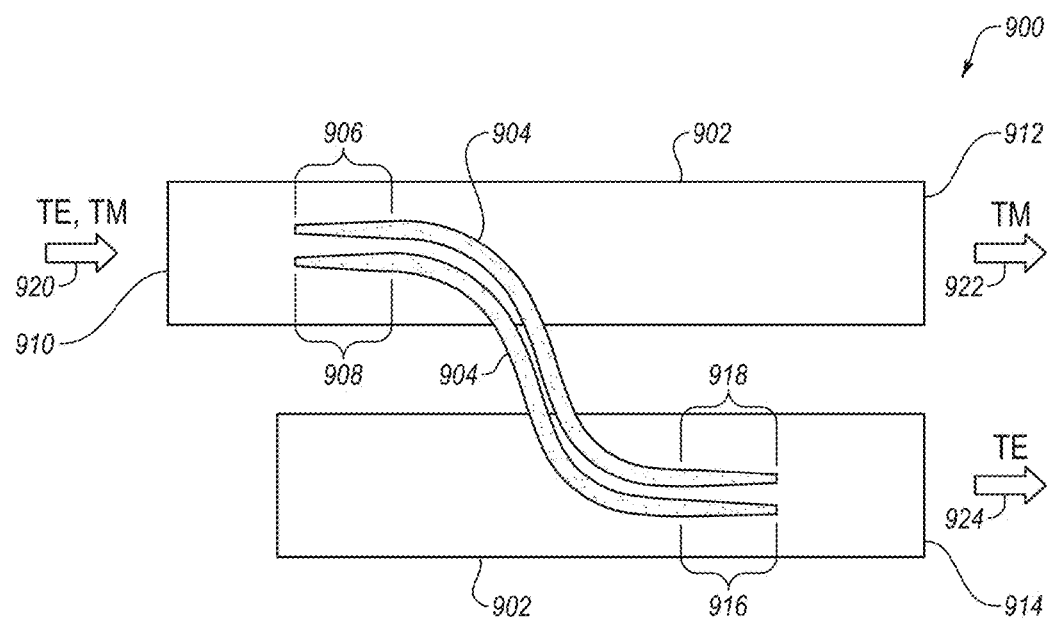
FIG. 9 depicts another example polarization splitter including an SiN waveguide and a Si waveguide.

In some other embodiments, at least of portion of the TE mode may be coupled from a Si layer back to a SiN layer. For example, FIG. 9 depicts an example polarization splitter 900, arranged in accordance with at least one embodiment disclosed herein. More specifically, FIG. 9 illustrates polarization splitter 900 including a SiN waveguide including a SiN waveguide core 902 and a SiN waveguide core 912 spaced apart from SiN waveguide core 902. Further, polarization splitter 900 includes a Si waveguide including a Si waveguide core 904. The waveguide cores shown in FIG. 9 may be surrounded by cladding (not illustrated in FIG. 9). In some embodiments, SiN waveguide core 902 and SiN waveguide core 912 may be formed in a first layer of a PIC, and Si waveguide core 904 may be formed in a second layer of the PIC that is above or below the first layer of the PIC.

According to various embodiments, SiN waveguide core 902 and SiN waveguide core 912 may be implemented as channel waveguide cores and Si waveguide core 904 may be implemented as a slot waveguide core. SiN waveguide core 902 may include a coupling portion 906 and Si waveguide core 904 may include a tapered portion 908 that tapers outward from an end of Si waveguide core 904.

Tapered portion 908 may be aligned (e.g., in two orthogonal directions (e.g., x and z directions)) with the coupling portion 906 of the SiN waveguide core 902 such that tapered portion 908 overlaps in the two orthogonal directions and is parallel to coupling portion 906. Tapered portion 908 of Si waveguide core 904 may be configured to couple most of a first polarization (e.g., TE polarization) of an input beam 920 to Si waveguide core 904 and to prevent most of a second polarization (e.g., TM polarization) of input beam 920 that is orthogonal to the first polarization from being coupled to Si waveguide core 904.

SiN waveguide core 912 may further include a coupling portion 916 and Si waveguide core 904 may include a tapered portion 918 that tapers inward toward an end of Si waveguide core 904. Tapered portion 918 may be aligned (e.g., in two orthogonal directions (e.g., x and z directions)) with the coupling portion 916 of the SiN waveguide core 902 such that tapered portion 918 overlaps in the two orthogonal directions and is parallel to coupling portion 916. Tapered portion 918 may be configured to couple most of the first polarization (e.g., TE polarization) to SiN waveguide core 912.

Polarization splitter 900 further includes an input port 910 for receiving an input beam 920, an output port 912 for outputting an output beam 922, and an output port 914 for outputting an output beam 924. More specifically, SiN waveguide core 902 includes input port 910 and output port 912, and SiN waveguide core 912 includes output port 914. In some embodiments, input beam 920 may include both TE and TM modes, output beam 922 may include the TM mode, and output beam 924 may include the TE mode.

Figure 10:
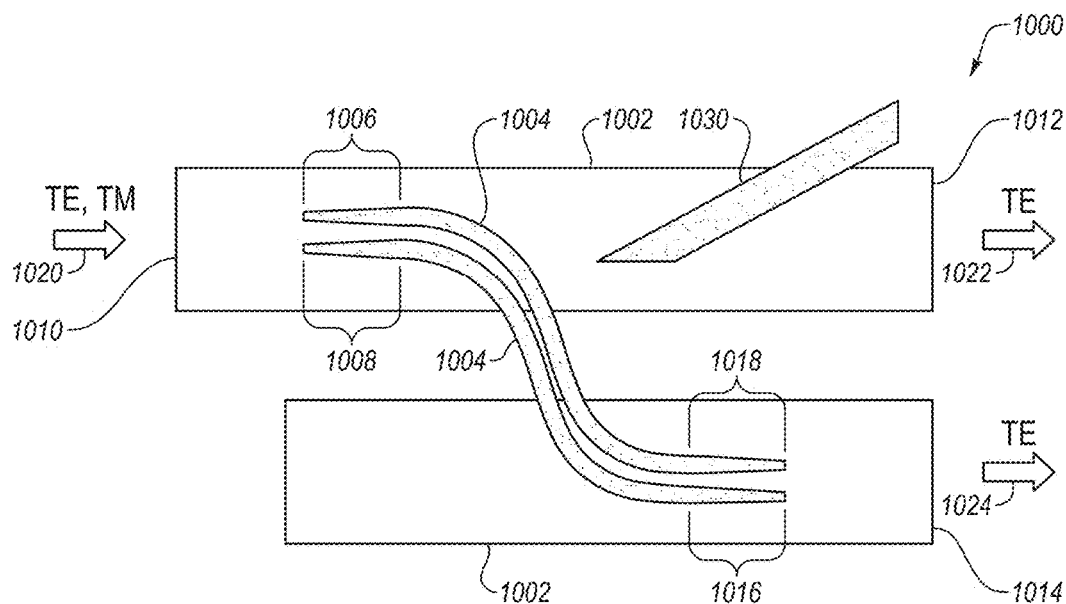
FIG. 10 depicts another example polarization splitter including a polarization rotator.

In some other embodiments, a polarization splitter may include a polarization rotator and may be configured to output one mode (e.g., the TE mode) at more than one output. For example, FIG. 10 depicts an example polarization splitter 1000, arranged in accordance with at least one embodiment disclosed herein. More specifically, FIG. 10 illustrates polarization splitter 1000 including a SiN waveguide having including a SiN waveguide core 1002 and a SiN waveguide core 1012 spaced apart from SiN waveguide core 1002. Further, polarization splitter 1000 includes a Si waveguide including a Si waveguide core 1004. The waveguide cores shown in FIG. 10 may be surrounded by cladding (not illustrated in FIG. 10). In some embodiments, SiN waveguide core 1002 and SiN waveguide core 1012 may be formed in a first layer of a PIC, and Si waveguide core 1004 may be formed in a second layer of the PIC that is above or below the first layer of the PIC.

According to various embodiments, SiN waveguide core 1002 and SiN waveguide core 1012 may be implemented as channel waveguide cores and Si waveguide core 1004 may be implemented as a slot waveguide core. SiN waveguide core 1002 may include a coupling portion 1006 and Si waveguide core 1004 may include a tapered portion 1008 that tapers outward from an end of Si waveguide core 1004.

Tapered portion 1008 may be aligned (e.g., in two orthogonal directions (e.g., x and z directions)) with the coupling portion 1006 of the SiN waveguide core 1002 such that tapered portion 1008 overlaps in the two orthogonal directions and is parallel to coupling portion 1006. Tapered portion 1008 of Si waveguide core 1004 may be configured to couple most of a first polarization (e.g., TE polarization) of an input beam 1020 to Si waveguide core 1004 and to prevent most of a second polarization (e.g., TM polarization) of input beam 1020 that is orthogonal to the first polarization from being coupled to Si waveguide core 1004.

SiN waveguide core 1012 may further include a coupling portion 1016 and Si waveguide core 1004 may include a tapered portion 1018 that tapers inward toward an end of Si waveguide core 1004. Tapered portion 1018 may be aligned (e.g., in two orthogonal directions (e.g., x and z directions)) with the coupling portion 1016 of the SiN waveguide core 1012 such that tapered portion 1018 overlaps in the two orthogonal directions and is parallel to coupling portion 1016. Tapered portion 1018 may be configured to couple most of the first polarization (e.g., TE polarization) to Si waveguide core 1012.

Polarization splitter 1000 further includes an input port 1010 for receiving an input beam 1020, an output port 1012 for outputting an output beam 1022, and an output port 1014 for outputting an output beam 1024. More specifically, SiN waveguide core 1002 includes input port 1010 and output port 1012, and SiN waveguide core 1012 includes output port 1014.

Further, polarization splitter 1000 includes a polarization rotator 1030, which may be configured to convert light from one polarization mode to another polarization mode. More specifically, in some implementations, polarization rotator 1030 may be configured to convert TM polarized light to TE polarized light. Thus, in some embodiments, polarization splitter 1000 may be configured to output the TE mode at both output ports 1012 and 1014. Thus, in some embodiments, input beam 1020 may include both TE and TM polarization modes, output beam 1022 may include TE polarization mode, and output beam 1024 may include the TE polarization mode.

Figure 11:
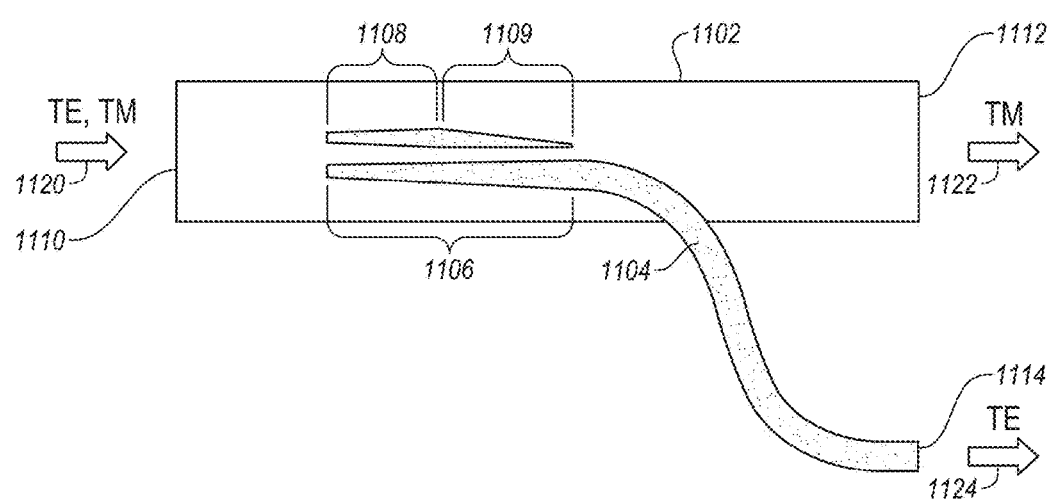
FIG. 11 depicts yet another example polarization splitter including an integrated slot-to-channel converter.

In some other embodiments, a polarization splitter may include a slot-to-channel waveguide convertor and may be configured to output the TE mode via a channel waveguide. For example, FIG. 11 depicts an example polarization splitter 1100, arranged in accordance with at least one embodiment disclosed herein. More specifically, FIG. 11 illustrates polarization splitter 1100 including a SiN waveguide having a SiN waveguide core 1102. Further, polarization splitter 1100 includes a Si waveguide including a Si waveguide core 1104. The waveguide cores shown in FIG. 11 may be surrounded by cladding (not illustrated in FIG. 10). In some embodiments, SiN waveguide core 1102 may be formed in a first layer of a PIC, and Si waveguide core 1104 may be formed in a second layer of the PIC that is above or below the first layer of the PIC.

According to various embodiments, SiN waveguide core 1102 may be implemented as a channel waveguide core and Si waveguide core 1004 may be implemented as a slot-to-channel waveguide core. SiN waveguide core 1102 includes a coupling portion 1106, and Si waveguide core 1104 may include a tapered portion 1108 that tapers outward from an end of waveguide core 1104. Si waveguide core 1104 further includes a tapered portion 1109 for transitioning from a slot waveguide core to a channel waveguide core.

Tapered portion 1108 may be aligned (e.g., in two orthogonal directions (e.g., x and z)) with the coupling portion 1106 of the SiN waveguide core 1102 such that at least some of tapered portion 1108 overlaps in the two orthogonal directions and is parallel to coupling portion 1106. Tapered portion 1108 of Si waveguide core 1104 may be configured to couple most of a first polarization (e.g., TE polarization) of an input beam 1120 to Si waveguide core 1104 and to prevent most of a second polarization (e.g., TM polarization) of input beam 1120 that is orthogonal to the first polarization from being coupled to Si waveguide core 1104.

Polarization splitter 1100 further includes an input port 1110 for receiving an input beam 1120, an output port 1112 for outputting an output beam 1122, and an output port 1114 for outputting an output beam 1124. More specifically, SiN waveguide core 1102 includes input port 1110 and output port 1112, and Si waveguide core 1104 includes output port 1114. In some embodiments, input beam 1120 may include both TE and TM polarization modes, output beam 1122 may include the TM polarization mode, and output beam 1124 may include the TE polarization mode.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A polarization splitter, comprising:
a silicon nitride (SiN) waveguide core configured to receive an input light signal including a first polarization mode and a second polarization mode; and
a silicon (Si) slot waveguide core disposed proximate the SiN waveguide core and including a tapered portion at a first end and configured to couple the first polarization mode to the Si slot waveguide core.

2. The polarization splitter of claim 1, wherein the SiN waveguide core includes a coupling region aligned with the tapered portion of the Si slot waveguide core in at least two orthogonal directions.

3. The polarization splitter of claim 1, further comprising a second SiN waveguide core spaced from the SiN waveguide core.

4. The polarization splitter of claim 3, wherein the Si slot waveguide core further includes a second tapered portion at a second end, opposite the first end and configured to couple the first polarization mode to the second SiN waveguide core.

5. The polarization splitter of claim 4, further comprising a polarization rotator disposed between an input port and an output port of the SiN waveguide core.

6. The polarization splitter of claim 1, wherein the first polarization mode comprises a transverse electric (TE) polarization mode and the second polarization mode comprises a transverse magnetic (TM) polarization mode.

7. The polarization splitter of claim 1, wherein the SiN waveguide core is formed in a layer of a Si photonic integrated circuit (PIC) and the Si slot waveguide core is formed in another layer of the Si PIC.

8. The polarization splitter of claim 1, wherein the tapered portion has a length of about 300 μm.

9. A system that includes a polarization splitter (PS), the PS comprising:
a silicon nitride (SiN) channel waveguide configured to: receive an input light signal including a first polarization mode and a second polarization mode; and output a beam including the second polarization mode; and
a silicon (Si) slot waveguide disposed beneath the SiN channel waveguide and including a tapered portion at a first end and configured to couple the first polarization mode to the Si slot waveguide, the Si slot waveguide configured to output a beam including the first polarization mode.

10. The system of claim 9, wherein the SiN channel waveguide includes a coupling region aligned with the tapered portion of the Si slot waveguide in at least two orthogonal directions.

11. The system of claim 9, wherein the tapered portion of the Si slot waveguide has a width of about 320 nm at the first end and a width of about 400 nm at a second, opposite end of the tapered portion.

12. The system of claim 9, wherein the SiN channel waveguide has a width of about 420 nm.

13. The system of claim 9, wherein the tapered portion has a length of about 300 μm.

14. The system of claim 9, further comprising a polarization rotator disposed between an input port and an output port of the SiN channel waveguide.

15. The system of claim 9, wherein the first polarization mode comprises a transverse electric (TE) polarization mode and the second polarization mode comprises a transverse magnetic (TM) polarization mode.

16. The system of claim 9, wherein the SiN channel waveguide is formed in a layer of a Si photonic integrated circuit (PIC) and the Si slot waveguide is formed in another layer of the Si PIC.

17. A polarization splitter, comprising:
a silicon nitride (SiN) waveguide core including a coupling region and configured to receive an input light signal including a first polarization mode and a second polarization mode; and
a silicon (Si) slot waveguide core disposed proximate the SiN waveguide core and including slot-to-channel converter, the Si waveguide core configured to couple to the first polarization mode.

18. The polarization splitter of claim 17, wherein the Si slot waveguide core includes a tapered portion aligned with the coupling region of the SiN waveguide core in at least two orthogonal directions.

19. The polarization splitter of claim 17, wherein the SiN waveguide core includes an input port to receive the input light signal and an output port to output a first output light signal including the second polarization mode, wherein the Si slot waveguide core includes an output port to output a second output light signal including the first polarization mode.

20. The polarization splitter of claim 17, wherein the SiN waveguide core is formed in a layer of a Si photonic integrated circuit (PIC) and the Si slot waveguide core is formed in another layer of the Si PIC.

* * * * *